April 24, 1934.  H. A. DOUGLAS  1,956,378
SWITCHING MECHANISM
Filed Jan. 2, 1932   2 Sheets-Sheet 1

Inventor
Harry A. Douglas
By Langdon Moore
Atty.

April 24, 1934.  H. A. DOUGLAS  1,956,378
SWITCHING MECHANISM
Filed Jan. 2, 1932   2 Sheets-Sheet 2
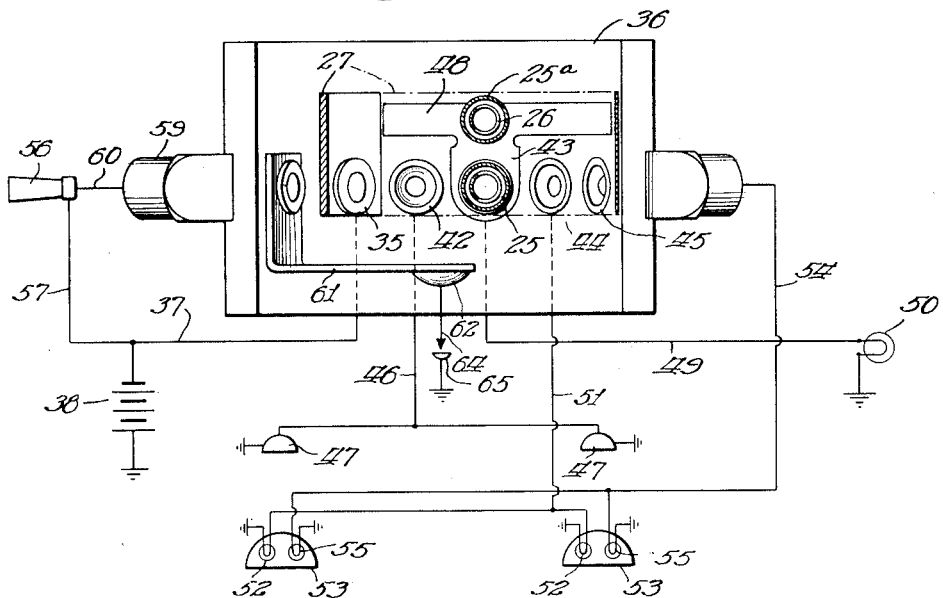
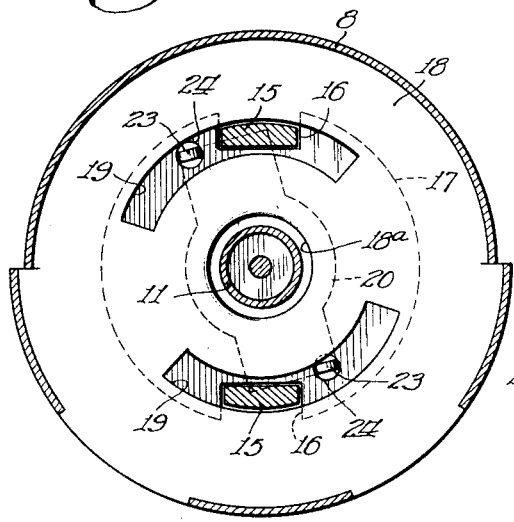
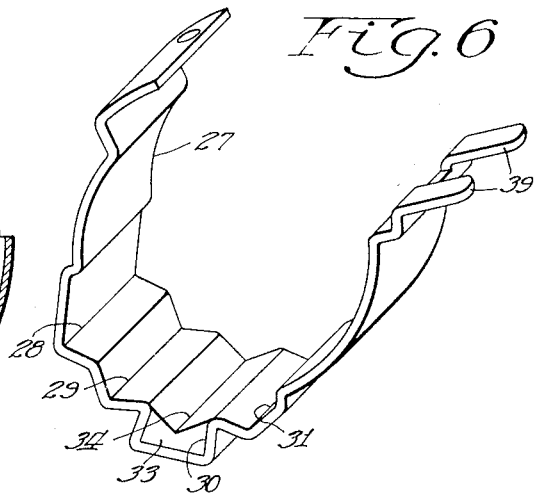
Inventor
Harry A. Douglas Patented Apr. 24, 1934

1,956,378

UNITED STATES PATENT OFFICE 1,956,378

SWITCHING MECHANISM

Harry A. Douglas, Bronson, Mich.

Application January 2, 1932, Serial No. 584,444

5 Claims. (Cl. 200—8)

This invention relates to switching mechanism more particularly for automotive vehicles and electrical circuits associated therewith.

Among other objects, the invention aims to provide improved switching mechanism which is efficient in operation and which is at the same time relatively simple and economical in construction.

My invention is of particular utility in connection with switching mechanism which is assembled with the lower end of the steering column of an automotive vehicle, the switching mechanism being actuated by a lever located adjacent the upper end of the steering column.

The invention will be more fully explained by reference to the illustrative construction shown in the accompanying drawings, in which—

Figure 4 is a section taken on the line 4—4 of Figure 3 and in addition showing diagrammatically a number of illustrative circuits associated therewith;

Figure 5 is a cross section taken on the line 5—5 of Figure 2; and

Figure 6 is a perspective view of one of the complementary contacts shown in the drawings and embodying my invention.

Figure 1:
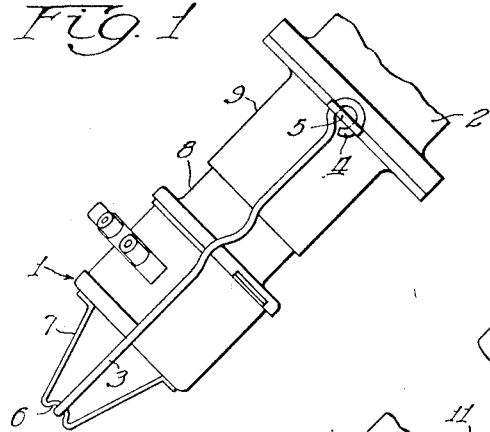
Figure 1 is a general view of my improved switching mechanism as it is preferably assembled with a steering column.

Referring to the figures of the drawings, I have shown in general a switch casing 1 assembled with the lower end of the steering column 2 as means of a flexible member, such as the wire strap 3, which is secured at each end to the steering column as by means of a loop 4 of the strap which encircles a lug 5 on the steering column. The strap 3 is in retaining engagement with the switch casing 1 by reason of the strap passing around the casing and through a groove 6 in a bracket 7 secured to the outer end of the casing. To further insure assembly of the casing and the steering column these parts may have a telescopic relationship, a cylindrical portion 8 of the casing being received in a cylindrical socket 9 fixed to the lower end of the steering column. To prevent relative rotation of the casing and the steering column, the casing may be provided with a lug $8^a$ struck out from the cylindrical portion 8 and which fits into an open ended slot $9^a$ in the socket 9. A coil spring 10 desirably interposed in the cylindrical portion 8 of the casing and between the casing and the steering column presses the casing against the strap 3 effecting a tight and secure engagement of the parts.

In the illustrative construction the spring 10 surrounds a shaft 11 which extends from the switch casing through the inclined steering column 2 to the steering wheel 12 where the shaft is suitably connected with a hand lever 13 by which the shaft 11 may be rotated.

At its lower end the shaft 11 has suitably fixed thereon a yoke 14 having fingers 15 which are snugly received in slots 16 in the insulating disc 17, which may thus be turned by rotation of the shaft 11. This rotation is here shown limited by a metallic plate 18 fixedly secured to the switch casing 1 and having the segmental slots 19 therein through which the fingers 15 pass. The plate 18 desirably has an axially extended cylindrical portion $18^a$ which serves as a hub for the disc 17 and assists to maintain the disc coaxial with the shaft 11.

A contact carrier is enclosed within the casing 1 represented, in this instance, by the metallic U-shaped frame 20 which has its mid-portion provided with an insulating hub 21 by which the contact carrier is journaled in the casing 1, the hub 21 seating revolubly in a flanged aperture 22 centrally disposed in the lower end of the casing. At the other end of the casing the free ends of the frame 20 bear against the insulating disc 17 and have extensions 23, which are received in apertures of the same size 24 (Fig. 5) in the disc 17, thus keying the frame 20 to the disc, so that the disc and contact carrier will rotate together.

The frame 20 carries a plurality of, in this instance two, spring pressed contacts 25 and $25^a$ which pass loosely through oppositely arranged holes $25^b$ in the sides of the U-shaped frame 20. The contacts 25, $25^a$ are disposed parallel in a common plane extending along and passing through the axis of the shaft 11 and each extends on diametrically opposite sides of the said axis. As here shown, each of the contacts 25, $25^a$ comprises two telescoping metallic tubes closed at their outer ends and enclosing a coil spring 26. One of these tubes is desirably flared at its inner end as at $25^c$ and the other expanded slightly as by being split as at $25^d$, to facilitate assembly of the parts. The spring 26 presses the tubes radially apart and maintains the contacts 25, $25^a$ at each end in engagement with circumferentially disposed complemental contacts carried by the casing 1. One of these complementary contacts is desirably produced in the form of a relatively thin metallic plate 27 which is bent to corrugated form to provide a plurality of parallel grooves 28, 29, 30 and 31 disposed longitudinally of the axis of the shaft 11. These grooves are desirably V-shape and receive with a snap action the V-shape terminations 32 of one end of the contacts 25 25ᵃ. One of these grooves such as the groove 30 need not itself be V-shape but, for a purpose presently pointed out, is advantageously filled with a block of insulation 33 in which the V-shape groove 34 is formed corresponding to the grooves 28, 29 and 31.

The plate 27 is electrically connected at one end to a metallic terminal post 35 carried by a semi-cylindrical insulating wall member 36 fixedly secured to and forming a part of the casing 1. An insulated conductor 37 (Fig. 4) electrically connects the terminal 35 and consequently the plate 27 with one side of the battery or other source of current 38. The plate 27 is insulated from the casing 1 as by being spaced from the metallic wall thereof and anchored at its end opposite the terminal 35 in the insulating wall member 36, as by the fingers 39. Thus the contacts 25, 25ᵃ are confined between the plate 27 and the wall member 36.

The contacts 25, 25ᵃ provide electrical bridging members between the plate 27 and other complementary contacts circumferentially disposed within the casing 1 on the insulating wall member 36 and thus upon the side of the casing diametrically opposite and coaxial with the grooves 28, 29, 30 and 31, and also coaxial with the shaft 11. The rounded end 40 of the contact 25 seats in cup-shaped contact portions 41 of metallic terminal members 42, 43, 44 and 45. The portions 41 of each of these terminal members are clinched upon the inner face of the insulating closure, the complementary contacts thus formed being disposed in a common plane which is transverse to the axis of the shaft 11 and which passes through the contact 25. The contact 25 thus forms an electrical bridge between the contact 27 and the contacts 42, 43, 44 and 45. The contact 25ᵃ forms a bridge between the contact 27 and a contact later described.

So constructed and arranged the switching mechanism resists accidental operation and the switch is positively located in its selective operative positions by the V-shape terminations 32 of the contacts 25, 25ᵃ and the mating V-shape grooves of the plate 27. The mechanism also desirably moves into these operative positions by a rapid snap action.

Figure 3:
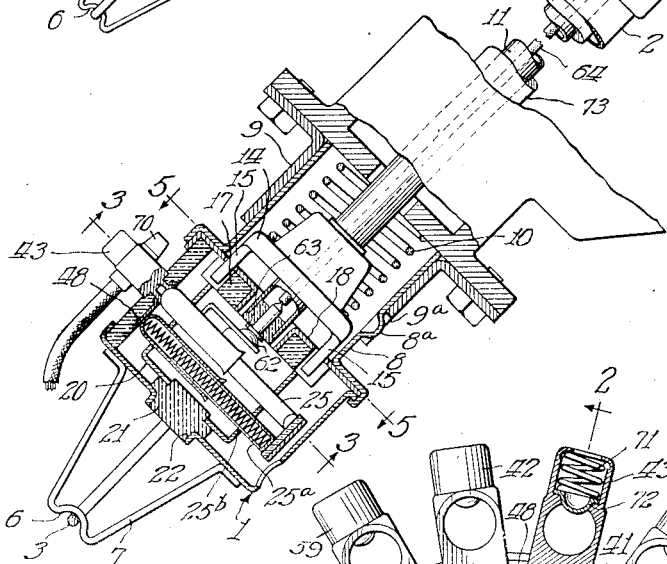
Figure 3 is a cross section taken on the line 3—3 of Figure 2.
Figure 3:
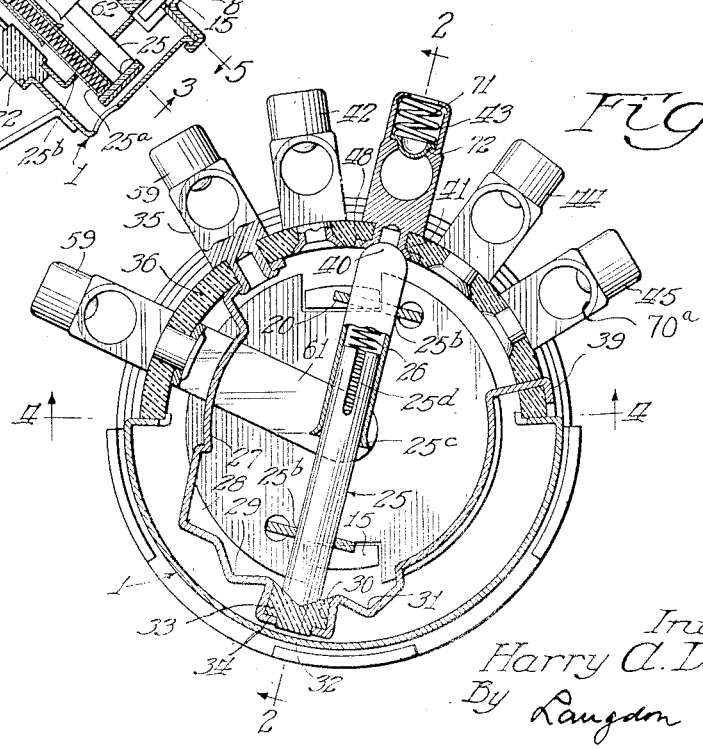

When the frame 20 is in the position shown in Figure 3, the terminations 32 of the contacts 25 and 25ᵃ are in the groove 34 in the insulating block 33 and consequently the circuit through the battery 38 is discontinued. When, however, the shaft 11 and consequently the frame 20 are rotated to cause the contacts 25 and 25ᵃ to have their terminations 32 located in the grooves 31, for example, a circuit is established through the battery 38, conductor 37, plate 27, contact 25, terminal 42 and conductor 46, through the two grounded filaments of the parking lights 47. At the same time another circuit is established, through the battery 38, conductor 37, plate 27, contact 25ᵃ, contact plate 48 (which is arcuately set in the insulating wall 36 and is a continuation of terminal 43) and conductor 49, through the grounded filament of the rear or tail light 50.

Similarly, when the frame 20 is rotated to cause the contacts 25 and 25ᵃ to have their terminations 32 located in the groove 29, a circuit is established through the battery 38, conductor 37, plate 27, contact 25, terminal 44, conductor 51, through the grounded filaments 52 of the driving lamps 53. The filaments 52 may be the intermediate driving lights, for example, as by being located above the focus of the lamps 53. At the same time, when the frame 20 is in this position, another circuit is established through the contact 25ᵃ, plate 48, and to the rear light 50.

When, again, the contact carrier frame is further rotated to cause the contacts 25 and 25ᵃ to have their terminations 32 located in the groove 28, a circuit is established through the battery 38, plate 27, contact 25, terminal 45 and conductor 54 through the grounded filaments 55 of the driving lamps 53. The filaments 55 may be the normal driving lights of the vehicle as by being located in the focus of the lamps 53. At the same time, when the contact carrier frame is in this position, a circuit is established also through the contact 25ᵃ and plate 48, through the rear light 50, as is now understood. Thus in any position of the contact carrier except the "off" position (at which latter time the contacts 25 and 25ᵃ have their terminations 32 located in the groove 34 of the insulating block 33) the rear light 50 is energized, as well as one of the pairs of parking, intermediate driving lights, or normal driving lights.

An electromagnetic horn 56 is desirably connected with the battery 38 by the conductor 57 and with the terminal 59 by the conductor 60. The terminal 59 may have a spring continuation 61 terminating in a contact 62 which is complementary to an insulated contact 63 carried by the lower end of the shaft 11. An insulated wire 64 connected with the contact 63 passes through the shaft 11, which is hollow for this purpose, and terminates in a contact button 65 centrally located in the insulating disc 66 supported upon the hub of the lever 13 at the upper end of the shaft 11. To energize the horn 56, a metallic cap 67 which is superposed upon the disc 66 but is normally spaced from the contact button 65 by the action of the spring 68, is depressible against the action of the spring and axially of the metallic housing 68ᵃ. The cap and housing have overlapping flanges as at 69 which limit the movement of the cap away from the disc 66. The cap (and consequently the horn 56, when the cap is depressed) is grounded through spring 68 or the housing 68ᵃ, lever 13 and shaft 11, thus completing the circuit back to the other side of the battery.

Figure 2:
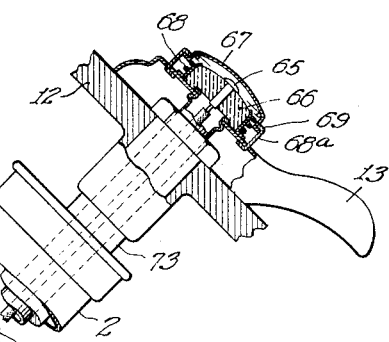
Figure 2 is an enlarged view, partially in section, of the structure of Figure 1, and taken on the line 2—2 of Figure 3.

The conductors 37, 46, 49, 51, 54 and 60 may be connected with their respective terminals as by being provided with metallic terminal plugs 70 (Fig. 2) of conventional bulbous formation which are received in cylindrical openings 70ᵃ in the terminals and yieldably retained therein by the action of the springs 71 through the intermediation of detents 72 which snap over the bulbous plugs 70.

The steering column 2 is illustrated as enclosing a steering shaft 73 which does not enter into the present invention, a further description thereof being therefore unnecessary.

Obviously, the invention is not limited to the specific details of construction herein described for purposes of exemplification and such changes may be made as fall within the scope of the following claims without departing from the invention.

Reference may be here made to my subsequently filed, but copending applications, showing switch structures of somewhat generally similar construction, such as Serial No. 586,366, filed January 13, 1932 which became Patent No. 1,928,414, September 26, 1933; Serial No. 591,261, filed February 6, 1932 which became Patent No. 1,922,326, August 15, 1933, and Serial No. 593,802, filed February 18, 1932, the latter of which has issued as Patent No. 1,883,625.

I claim:

1. In a switching mechanism, the combination with a rotatable shaft; of a contact carrier keyed to rotate with the shaft, said contact carrier carrying a plurality of radially spring pressed contacts extending on diametrically opposite sides of the axis of the shaft and arranged in a single plane extending along said axis, said contacts each comprising two telescoping tubes having their outer ends closed and jointly enclosing a coil spring; complementary contacts circumferentially arranged about said contact carrier to be engaged simultaneously by both ends of the contacts carried by the contact carrier, whereby said contacts provide a bridge between the circumferentially disposed contacts, one of said circumferentially arranged complementary contacts being in the form of a metallic plate bent arcuately about said axis to form corrugations against which one end of each of the spring pressed contacts rides; and an insulating insert in one of the corrugations.

2. The structure of claim 1 wherein the spring pressed contacts have V-shape terminations at one end, and the circumferentially disposed contact bent to corrugated form provides parallel V-shape grooves therein disposed longitudinally of the shaft, said grooves receiving said V-shape terminations of the contacts, and the insulating insert in one of the grooves is also provided with a V-shape groove for receiving the terminations.

3. The structure of claim 1 wherein the contact carrier is in the form of a U-shape metal frame carrying at its mid-portion an insulating hub upon which it is journaled in the casing, the free end of the U engaging an insulating disc which is keyed to the shaft, and said spring pressed contact passes through holes in the sides of the U.

4. In a switching mechanism, the combination with a casing; of a semi-cylindrical insulating wall carried by said casing; a rotatable member in said casing; spring pressed diametrically oppositely directed contacts carried by said member; complementary contacts carried by the insulating wall, said spring pressed contacts providing a current conducting bridge between said complementary contacts, one of said complementary contacts being in the form of a generally arcuately bent metallic plate carried by said insulating wall and spaced about an opposite wall of said casing; grooves in said plate into and out of which the spring pressed contacts ride to effect a snap action of the switch; and a grooved insulation insert in one of the grooves to discontinue a circuit through the spring pressed contacts.

5. In a switching mechanism, the combination with a metallic casing; of a semi-cylindrical insulating wall forming a closure for the casing; contacts carried by said wall within the casing and having terminals projecting outwardly of the casing, one of said contacts being in the form of a metallic plate anchored at its ends to the insulating wall and bent about the opposite wall of the casing but spaced therefrom; and a bridging contact rotatable between said plate and simultaneously engaging the plate and one of the other contacts carried by the insulating wall.

HARRY A. DOUGLAS.